United States Patent
Moagar-Poladian

(10) Patent No.: US 9,975,199 B2
(45) Date of Patent: May 22, 2018

(54) RAPID MANUFACTURING PROCESS BY USING A FOCUSED ULTRASOUND BEAM

(71) Applicant: INSTITUTUL NATIONAL DE CERCETARE-DEZVOLTARE PENTRU MICROTECHNOLOGIE-IMT, București-Voluntari (RO)

(72) Inventor: Gabriel Moagar-Poladian, Bucharest (RO)

(73) Assignee: INSTITUTUL NATIONAL DE CERCETARE-DEZVOLTARE PENTRU MICROTECHNOLOGIE-IMT, Bucharest (RO)

( * ) Notice: Subject to any disclaimer, the term of this patent is extended or adjusted under 35 U.S.C. 154(b) by 70 days.

(21) Appl. No.: 15/028,532

(22) PCT Filed: Oct. 10, 2014

(86) PCT No.: PCT/RO2014/000029
§ 371 (c)(1),
(2) Date: Apr. 11, 2016

(87) PCT Pub. No.: WO2015/053644
PCT Pub. Date: Apr. 16, 2015

(65) Prior Publication Data
US 2016/0250711 A1    Sep. 1, 2016

(30) Foreign Application Priority Data

Oct. 11, 2013   (RO) ................ A201300736

(51) Int. Cl.
*B23K 20/10*    (2006.01)
*B22F 3/10*    (2006.01)
(Continued)

(52) U.S. Cl.
CPC ............... *B23K 20/10* (2013.01); *B22F 3/10* (2013.01); *B28B 1/001* (2013.01); *B29C 64/153* (2017.08);
(Continued)

(58) Field of Classification Search
None
See application file for complete search history.

(56) References Cited

U.S. PATENT DOCUMENTS 6,215,093 B1 *   4/2001   Meiners ................ B22F 3/1055
                                                        219/121.61
6,450,393 B1     9/2002   Doumanidis et al.
(Continued)

FOREIGN PATENT DOCUMENTS

TW       545095 B       8/2003
WO       0000344 A1     1/2000

OTHER PUBLICATIONS

European Patent Office, International Search Report and Written Opinion dated Apr. 7, 2015 for PCT International Application No. PCT/RO2014/000029, international filing date Oct. 10, 2014, priority date Oct. 11, 2013.
(Continued)

*Primary Examiner* — Devang R Patel
(74) *Attorney, Agent, or Firm* — Law Office of Andrei D Popovici, PC

(57) ABSTRACT

The invention refers to a process for rapid manufacturing that uses a focused ultrasound beam according to the invention. The process is based on the local ultrasound welding of the material (2) grains that is under a powder form, welding that takes place solely in the focal spot of the focused ultrasound beam, the focal spot being scanned across the X-Y-Z directions within the powder (2) bed so as to 3D build the entire object (7) that is desired. The processes taking place in the focal spot region are local melting, local melting due to friction followed by filling of the gaps existing
(Continued)

Figure 1:
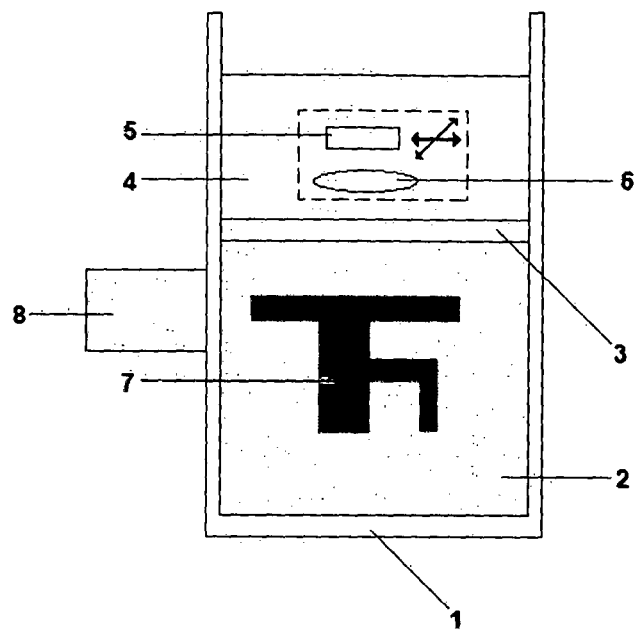

between grains, removal of the grain asperities, local interdiffusion between neighboring grains as well as other phenomena that take place at the interfaces between materials when these are subjected to an ultrasound field.

20 Claims, 1 Drawing Sheet

(51) Int. Cl.
    *B33Y 10/00*     (2015.01)
    *B29C 64/10*     (2017.01)
    *B28B 1/00*     (2006.01)
    *C03B 19/01*     (2006.01)
    *B29C 64/153*     (2017.01)
    *B29K 105/00*     (2006.01)

(52) U.S. Cl.
    CPC .............. *B33Y 10/00* (2014.12); *C03B 19/01* (2013.01); *B22F 2999/00* (2013.01); *B29K 2105/251* (2013.01)

(56) References Cited

U.S. PATENT DOCUMENTS

| | | | | |
|---|---|---|---|---|
| 6,519,500 | B1* | 2/2003 | White | G05B 19/00 156/73.1 |
| 6,814,823 | B1* | 11/2004 | White | B23K 11/0013 156/73.1 |
| 2007/0176312 | A1* | 8/2007 | Clark | B22F 3/1055 264/40.1 |
| 2011/0190904 | A1* | 8/2011 | Lechmann | A61B 17/7208 623/23.61 |
| 2014/0050921 | A1* | 2/2014 | Lyons | B29C 67/0051 428/372 |
| 2014/0163717 | A1* | 6/2014 | Das | B22F 3/1055 700/119 |
| 2014/0255620 | A1* | 9/2014 | Shuck | B05D 3/12 427/560 |
| 2015/0041025 | A1* | 2/2015 | Wescott | B23K 9/042 148/538 |

OTHER PUBLICATIONS

Yadav et al., "Thermomechanical Analysis of an Ultrasonic Rapid Manufacturing (URM) System," Journal of Manufacturing Processes, vol. 7/No. 2, Society of Manufacturing Engineers, Dearborn, MI, 2005, the year of publication is sufficiently earlier than the effective U.S. filing date and any foreign priority date so that the particular month of publication is not in issue.

\* cited by examiner

RAPID MANUFACTURING PROCESS BY USING A FOCUSED ULTRASOUND BEAM

The invention refers to a process of rapid manufacturing that uses a focused beam of ultrasound.

It is known a rapid manufacturing process that uses laser radiation consisting the in a layer-by-layer building up of the desired object by locally/selectively melting the initial powder material, melting that is produced by the laser beam. This process is known as selective laser sintering/selective laser melting in the case of polymers and, respectively, as direct metal laser sintering/selective laser melting in the case of metals.

In it is known a process of rapid manufacturing that consists in the layer-by-layer realization of desired object by using local photopolymerization produced by an optical beam of the initial photosensitive material. The photopolymerization may take place either as a single photon photopolymerization process or as a two-photon photopolymerization process.

The drawbacks of the selective laser sintering/selective laser melting—either for metals or for polymers—are:
- for each specific class of materials—namely polymers, metals, ceramic—a specific laser is needed as regards wavelength and output power.
- the building process is slow because: a layer is deposited first, laser sintering/melting takes place after, and then a novel layer of material is deposited and so on. Because the laser beam is absorbed in and reflected by the deposited material, only thin layers of material can be deposited. For the polymers, each deposited layer must be first pre-heated and only after that sintered/melted. This adds more as regards build time.
- at the present time, only one material can be used at a time, this material being either simple or composite or alloy.
- in the case of metals, support structures are needed for avoiding the deformation of the part during the building process as a result of temperature gradients existing within the part.

The drawbacks of the photopolymerization process—either single photon or two-photon—are:
- the palette of materials is quite limited—specifically solely to so-called photo-polymers/photo-resins—being scarcer in the case of two-photon photopolymerization.
- at the present time, only one material can be used at a time.

The problem solved by the invention is due to the allowance of a more rapid manufacturing process for parts having complex geometries than the previous state-of-the-art mentioned above, by using a wide palette of materials and without being necessary to change the equipment and without the need of using support structures.

The proposed solution, according to the invention, eliminates the drawbacks mentioned by using a focused beam of ultrasound that locally welds the powder grains and that is able to penetrate deeper in the powder mass thus making unnecessary the layer-by-layer deposition step—or at least reducing significantly the number of deposited layers—in this way increasing the building speed. Moreover, the building system can be used for a large palette of materials such as metals and their alloys, ceramics, polymers, glasses, the only condition being that they must be ultrasound weldable. Moreover, in some cases, different materials can be used at the same time during the building process.

The advantages of the rapid manufacturing process by using focused ultrasound beam are:
- it enables a rapid 3D building process, without the need of depositing layer-by layer or, in the case of larger objects, by depositing only a very small number of layers and without the need of pre-heating.
- it can be used for a large palette of materials without being necessary to change the working system.
- it allows a part density close to that of the bulk material because of the pressing step during the building process.
- does not need support structures, the object to be built being embedded in the pressed powder.
- in some cases, it allows the realization of multi-material structures.

We present in the following an example regarding the realization of the invention in relation with FIGS. 1 . . . 2 that represents:

FIG. 1: sketch of an ensemble used for the rapid manufacturing of parts by using a focused ultrasound beam.

Figure 2:
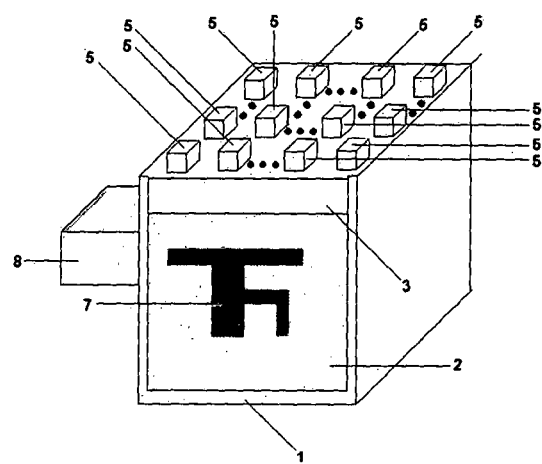

FIG. 2: version without liquid and with an array of individual ultrasound sources The process, according to the invention, is based on the local welding of the powder grains by focusing the ultrasound beam(s) into a focal spot and by scanning of the focal spot in the mass of the powder. At least some of the following processes may take place in the focal spot: local melting, local melting due to friction followed by the filling of the gaps existing the powder mass, removal of grain asperities, local inter-diffusion between the powder grains as well as other phenomena that take place at the interfaces between materials when these are exposed to an ultrasound field. The process contains the following steps:

step 1: filling of a bin (1) with the powder of material (2) that will e used for making the object. The thickness of the powder bed (2) is determined by the attenuation distance of the ultrasound used for the building process in the respective powder (2) within the working conditions used for building the desired object and by the maximum vertical travel allowed for the focal spot. The powder is supplied to the bin (1) by current state-of-the-art feeding systems.

step 2: degassing and eventual drying of the powder. This step can be achieved in a slight vacuum, the pressure being contained in the $10^{12}$ Torr to 0.1 Torr range. Moreover, the bin (1) containing the powder material (2) can be vibrated a certain time interval in order to compactify the powder mass, the vibration frequency ranging in the 2 Hz and 2 MHz interval while the vibration amplitude ranges between 10 nm and 1 mm.

step 3: application of a cap/sealing_(3) atop of powder (2) and pressing the powder (2) over the whole building duration with a large enough force, force magnitude that depends on the material used and on its properties. The bin (1) containing the powder (2) may also be vibrated a certain time interval during this step also, with the cap/sealing_(3) pressing powder (2), the vibration parameters being similar to those mentioned at step 2.

step 4: atop the cap/sealing_(3) is put a liquid (4) that has the role of creating an acoustic impedance match between source (5), respectively ultrasound optics (6) for focusing of ultrasound, and cap/sealing_(3), so that an optimum ultrasound power transfer being ensured. In some other situation, this liquid may lack/may not exist, the source (5) formed by an array of individual sources (5) being sit directly on the cap/sealing_(3).

step 5: if necessary, the powder (2) may be heated up to a certain temperature during the building process, but without evaporating or boiling the liquid (4), in case the liquid (4) is used.

step 6: the source (5) of ultrasound is started and—if ultrasound focusing optics (6) is used, optics (6) is descended so as the focal spot lies at the base of bin (1) in the powder bed (2).

step 7: that deepest layer of powder (2) mentioned in step 6 is scanned at constant height by the focal spot of the ultrasound, in this way the local/selective welding process taking place. The power of source (5) may be varied during the scan, being maximum only where the local welding of the powder grains is needed.

step 8: the ultrasound focal spot is moved up in the vertical direction, from bottom to top, on a certain distance determined by the spatial resolution of the ultrasound focal spot—more precisely, determined by the size of the ultrasound focal spot and by the power of source (5)—with the help of optics (6). Step 7 is repeated until the whole 3D object (7) is realized. In the case when the source (5) is an array of individual sourced (5) sitting on the cap/sealing_(3), the relative phase mismatch between the individual sources (5) is varied in such a way that the focal spot is scanned in all three spatial directions—making the object in a layer-by-layer from bottom to the top—with spatial resolution determined by the size of the ultrasound focal spot and by the power of the individual sources (5). Moreover, if the geometry of the object (7) allows, steps 7 and 8 can be merged together. If the object (7) is larger than the layer thickness deposited during step 1, then the cap/sealing_(3) is removed, then a new layer of powder (2) is put into the bin (1) with a thickness determined by the factors mentioned for step 1 and steps 2 to 8 are repeated. The whole ensemble of steps 1 to 8 is repeated until the whole object (7) is made. During same step 8 some non-destructive imaging techniques—as for example ultrasound imaging by using a frequency different than that used for 3D building the object (7)—may be used in order to monitor in real-time the building process and for determining the presence of any building errors. For example, the ultrasound imaging can be realized with an ecography system placed laterally with respect to the bin (1), the imaging ultrasound beam propagating at 90° with respect to the ultrasound beam used for the 3d building of the object (7).

step 9: after the completion of the object (7) building, the ensemble is left to cool down if this ensemble was heated during step 5.

step 10: if liquid (4) was used, then liquid (4) is taken-off from above the cap/sealing (3). If the liquid (4) is solid under ambient conditions, then liquid (4) is left to cool down and eventually solidify, after which the resulting solid material is removed from atop of the cap/sealing (3) if necessary.

step 11: the cap/sealing_(3) is removed.

step 12: the object (7) and the remaining powder (2) are taken off from the bin (1). Object (7) is cleaned as regards the eventual non-welded powder (2) grains remaining on it. This cleaning can be achieved in several ways as for example—but without restraining generality—gas blasting.

The cap/sealing_(3) is pressed against powder (2) during the whole period of object (7) building. If a liquid (4) is used, then the cap/sealing_(3) has a microstructured surface such as to create an acoustic impedance matching between liquid (4) and it but, at the same time, the specific size of the microstructures being much less than the ultrasound wavelength used for building the object (7).

The size of the grains composing powder (2) are situated in the range between 2 nm and 1 mm, the grains may have all the same size of they may have any size distribution as for example—but without restraining generality—a Gaussian distribution.

The bin (1) has walls that do not reflect ultrasounds in order to prevent formation of ultrasound standing waves inside the powder bed (2) during the building period of object (7).

The work parameters that may be varied depending on material (2) composition and its properties are ultrasound frequency, ultrasound power, size of the ultrasound focal spot—that is dependent on the ultrasound wavelength in material (2) and on the parameters of the focusing optics (6), respectively on the focusing capabilities of the array sources (5)—horizontal scanning speed, vertical scanning speed, the operating regime of the source (5) of ultrasounds—namely either continuous wave or intensity modulated or impulse with a specific duration and repetition frequency. Moreover, another work parameter is the pressing force of the cap/sealing_(3) against powder (2). In order to apply this force, known processes may be used, the force being applied preferably to the cap/sealing_(3) or, in another case, through the mediation of liquid (4).

The scanning of the ultrasound focal spot may be achieved either by using tunable/adaptive ultrasound optics elements within optics (6) and, respectively, X-Y scanning systems of the ultrasound beam or by moving the optics (6) along the X-Y-Z directions with known translation elements. IN this latter case, the movement of optics (6) within liquid (4) is made in such a way so as not affect the acoustical properties of the liquid (4). Also, each source (5) of the array may have its own optics (6) or all may share the same optics (6). In the latter case the scanning is achieved by varying the relative phase between the individual sources as well as the focal distance of optics (6) or, in another case, by just moving the optics upward with a predetermined distance in order to change the focal spot position along the vertical direction.

In another embodiment, the individual sources (5) of the array, each having its own optics (6), are building the object (7) in parallel—that is each spot builds its own part of the object (7) and correlated with the neighbour sources—by using one of the scanning methods presented in the previous paragraph.

In another embodiment, an array of individual and independent sources (5) are used, array within which a well determined phase and amplitude relationship exists between the individual sources (5), the phase and amplitude being varied with time in such a way that the focal spot scans the desired volume. In this case, the individual sources (5) are mounted atop the cap/sealing_(3). By this method, the speed of the focal spot within the desired volume can also be controlled very precisely.

The ultrasound frequency may have a value within 25 kHz and 100 GHz, the ultrasound power lies in the interval 1 nW and 100 kW, the ultrasound spot may have a spot size between 100 nm and 1 mm, the horizontal scanning speed may have values in the 1 micron/second and 1 m/second range, the vertical scanning speed may values between 1 micron/second and 1 m/second, the force pushing on the cap/sealing_(3) may have values in the 10 N and 100 MN range. The force value may vary during the building process of the object (7) if this fact is necessary.

The cap/sealing_(3), powder (2) and liquid (4) may have close values of the ultrasound speed such that no change of the ultrasonic wave type appears at the interfaces separating them. Instead, the ultrasound must propagate only as a single type—either solely longitudinal or solely transversal. If here are two types of ultrasound waves then two foci appear—since the two types of waves have different propagation velocities—and the construction of the object (7) is disturbed.

Up to now, we have considered that powder (2) is formed by only one material that is placed inside bin (1). In certain situations, bin (1) can be filled with several materials (2) of different type and/or composition, each material (2) type being placed according to the needed structure of object (7). These materials (2) must have some characteristics among which we mention: each of them must be weldable with ultrasounds, they must be weldable together, must have acoustical properties—namely the ultrasound speed—of close values in order to avoid reflections and interference of ultrasound waves at their interfaces, as well as they must have close values for the ultrasound power that promotes their welding.

We present an example of the invention. The bin (1) is realized from steel and has microstructured walls. At its exterior surface, the bin (1) is covered with a material that absorbs ultrasound. The powder (2) inserted within the bin (1) is made of Aluminium having grains with a size of few microns. The Aluminium powder (2) is filling the bin (1) up to its top. The cap/sealing (3) is made of steel whose upper surface in contact with the liquid (4) is microstructured, having pyramids with a base size of 10 microns and a height of 10 microns. The force applied to cap/sealing (3) has a value of 100 kN. The liquid (4) is water. The source (5) of ultrasounds emits ultrasounds at a frequency of 500 MHz and a power of 100 W in a form of impulses having a duration of 1 microsecond and a repetition rate of 100 kHz. The optics (6) focuses the ultrasounds in a spot with a size of 10 microns. The horizontal scanning speed is of 10 cm/second while the vertical scanning speed is 1 mm/second.

The invention claimed is:

1. A rapid manufacturing process using a focused ultrasound beam, wherein the process makes use of local welding of powder grains that are placed in a focal spot of the focused ultrasound beam, a process taking place in the focal spot of the focused ultrasound beam being at least one of local melting, local melting because of friction followed by filling of gaps existing between grains, removal of grain asperities, and local inter-diffusion between neighboring grains, the focal spot of the ultrasound beam being scanned within a mass of powder comprising powder grains held within a bin so as to create an object, the rapid manufacturing process using the focused ultrasound beam including the following steps:
applying a cap/sealing atop the mass of powder, pressing the cap/sealing against the powder, and placing an acoustic impedance-matching liquid atop the cap/sealing for improving an acoustic power transfer to the cap/sealing;
scanning the focal spot at a constant height along a bottom of the mass of powder to cause selective welding of the powder, wherein the selective welding of the powder creates at least part of the object embedded in the mass of powder,
moving up the focal spot in a vertical direction to one or more new heights within the mass of powder, and scanning the focal spot at the one or more new heights to cause selective welding of the powder so as to build the object embedded in the mass of powder.

2. The rapid manufacturing process of claim 1, wherein the bin has walls that do not reflect ultrasound in order to prevent a formation of standing waves inside the powder while the object is built.

3. The rapid manufacturing process of claim 1, wherein the cap/sealing has a microstructured surface in contact with the liquid, a characteristic length of the microstructure being smaller than a wavelength of the ultrasound beam.

4. The rapid manufacturing process of claim 1, wherein the focal spot scanning is achieved by using an array of individual ultrasound sources having determined phase and amplitude relationships between the ultrasound sources, wherein multiple ultrasound sources of the array contribute to the focal spot.

5. The rapid manufacturing process of claim 1, wherein the focal spot scanning is achieved by using tunable/adaptive acoustic optics within an ultrasound optics system and using an X-Y scanning system.

6. The rapid manufacturing process of claim 1, further comprising achieving focal spot scanning by controlling an X-Y-Z movement of a whole ensemble formed by a source of ultrasound and the ultrasound optics system.

7. The rapid manufacturing process of claim 1, wherein building the object is performed in parallel by an array of individual ultrasound sources, each ultrasound source having its own focal spot and its own associated ultrasound optics element.

8. The rapid manufacturing process of claim 1, wherein a system controller is configured to be able to vary a plurality of parameters in order to control building the object, wherein the plurality of parameters includes: ultrasound frequency, ultrasound power, focal spot size, horizontal scanning speed of the focal spot, vertical scanning speed of the focal spot, a gas pressure inside the bin, a temperature of the powder, a force pressing a cap/sealing onto the mass of powder, and a working mode of an ultrasound source, wherein the working mode is selected from a continuous wave mode, an intensity modulated wave mode, and an impulse mode.

9. The rapid manufacturing process of claim 1, wherein a frequency of the ultrasound beam has a value between 25 kHz and 100 GHz, a power of the ultrasound beam is between 1 nW and 100 kW, and a spot size of the ultrasound beam is between 100 nm and 1 mm.

10. The rapid manufacturing process of claim 1, wherein a horizontal scanning speed of the ultrasound beam has a value between 1 micron/second and 1 m/second, and a vertical scanning speed of the ultrasound beam has a value between 1 micron/second and 1 m/second.

11. The rapid manufacturing process of claim 1, further comprising applying a force to the cap/sealing, wherein the force applied to the cap/sealing has a value between 10 N and 100 MN, wherein a system controller is configured to vary a magnitude of the force during the building of the object.

12. The rapid manufacturing process of claim 1, wherein the powder grains are selected from metallic powders, ceramic powders, polymer powders, and glass powders, and wherein the powder grains are selected from single-material powder grains, composite powder grains, mixture powder grains, and alloy powder grains.

13. The rapid manufacturing process of claim 12, wherein the powder grains placed in the bin comprise at least two different types of powder grains, each of a different material, the different materials being weldable together by ultrasound.

14. The rapid manufacturing process of claim 1, wherein the powder comprises a material selected from monocrystalline, polycrystalline, amorphous and vitreous materials.

15. The rapid manufacturing process of claim 1, further comprising monitoring the building of the object in real time by ultrasound imaging for ensuring a detection of possible building errors, the ultrasound imaging being realized with an ecograph ultrasound imaging system placed on a lateral side of the bin, an imaging ultrasound beam emitted by the imaging system propagating at an angle of 90° with respect to a main propagation direction of the focused ultrasound beam used for building the object, wherein the imaging ultrasound beam and the focused ultrasound beam used for building the object have different frequencies.

16. The rapid manufacturing process of claim 1, wherein the cap/sealing, powder and impedance-matching liquid placed atop the cap/sealing have values of ultrasound propagation speed sufficiently close to avoid a change of ultrasound wave type when crossing their interfaces, allowing a propagation of a single ultrasound wave type selected from solely longitudinal and solely transversal.

17. The rapid manufacturing process of claim 1, further comprising:
    degassing and drying the powder;
    vibrating the powder; and
    controlling a temperature of the powder.

18. The rapid manufacturing process of claim 1, further comprising removing the cap/sealing from the powder.

19. The rapid manufacturing process of claim 1, further comprising cleaning the object to remove any non-welded powder grains from the object.

20. The rapid manufacturing process of claim 4, wherein the array of individual ultrasound sources is coupled to a single ultrasound optics element.

\* \* \* \* \*

UNITED STATES PATENT AND TRADEMARK OFFICE
CERTIFICATE OF CORRECTION

PATENT NO. : 9,975,199 B2
APPLICATION NO. : 15/028532
DATED : May 22, 2018
INVENTOR(S) : Gabriel Moagar-Poladian Page 1 of 1

It is certified that error appears in the above-identified patent and that said Letters Patent is hereby corrected as shown below:

On the Title Page

Under Applicant, replace "MICROTECHNOLOGIE-IMT" with --MICROTEHNOLOGIE-IMT BUCURESTI--.

Under Assignee, replace "MICROTECHNOLOGIE" with --MICROTEHNOLOGIE--.

Signed and Sealed this
Tenth Day of July, 2018

Andrei Iancu
*Director of the United States Patent and Trademark Office*